United States Patent
Copty

(10) Patent No.: US 12,481,487 B2
(45) Date of Patent: Nov. 25, 2025

(54) MAPPING PIPELINE RUN SOURCES AND TARGETS IN CLOUD INFRASTRUCTURES

(71) Applicant: Microsoft Technology Licensing, LLC, Redmond, WA (US)

(72) Inventor: Fady Copty, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 201 days.

(21) Appl. No.: 18/315,967

(22) Filed: May 11, 2023

(65) Prior Publication Data
US 2024/0378037 A1   Nov. 14, 2024

(51) Int. Cl.
*G06F 8/41* (2018.01)

(52) U.S. Cl.
CPC ............ *G06F 8/4452* (2013.01); *G06F 8/427* (2013.01); *G06F 8/433* (2013.01)

(58) Field of Classification Search
CPC .................................................. G06F 8/4452
See application file for complete search history.

(56) References Cited

U.S. PATENT DOCUMENTS

| | | | | |
|---|---|---|---|---|
| 10,318,285 | B1 * | 6/2019 | Jodoin | G06F 11/3688 |
| 11,947,946 | B1 * | 4/2024 | Rao | G06N 20/20 |
| 12,095,796 | B1 * | 9/2024 | Godefroid | G06F 9/542 |
| 2018/0364985 | A1 * | 12/2018 | Liu | G06F 8/36 |
| 2019/0114417 | A1 * | 4/2019 | Subbarayan | G06F 21/554 |
| 2020/0125344 | A1 * | 4/2020 | Varghese | G06F 8/37 |
| 2020/0242254 | A1 | 7/2020 | Velur | |
| 2020/0358780 | A1 * | 11/2020 | Anbalagan | H04L 63/102 |
| 2020/0364345 | A1 * | 11/2020 | Hecht | G06F 21/577 |
| 2021/0099478 | A1 * | 4/2021 | Seetharamaiah | H04L 63/1433 |
| 2022/0236976 | A1 * | 7/2022 | Wiegley | G06F 8/71 |
| 2022/0253333 | A1 * | 8/2022 | Rizzi | G06F 8/36 |

(Continued)

FOREIGN PATENT DOCUMENTS

| | | | | |
|---|---|---|---|---|
| CN | 117120984 A | * | 11/2023 | G06F 11/2028 |
| JP | 2023151721 A | * | 10/2023 | G05B 23/0243 |
| WO | WO-2020046981 A1 | * | 3/2020 | G06F 11/079 |

OTHER PUBLICATIONS

International Search Report and Written Opinion received for PCT Application No. PCT/US2024/028691, Sep. 23, 2024, 15 pages.

(Continued)

*Primary Examiner* — Francisco J Aponte

(57) ABSTRACT

According to examples, an apparatus includes a processor that may obtain and parse a pipeline code to determine how variables of the pipeline code relate to each other, and replace the variables in the parsed pipeline code with values to which the variables respectively represent, in which the values correspond to pipeline run sources and pipeline run targets of API calls. The processor may also identify how the pipeline run targets interact with the pipeline run sources of the API calls and build a dependency graph that maps the pipeline run sources with the pipeline run targets. Runtime resources may thus be mapped to source code in a pipeline run to provide visibility into actions carried out by the pipeline. This visibility may be used to determine whether there are security vulnerabilities in the pipeline run sources and/or targets such that the vulnerabilities may be addressed/overcome.

20 Claims, 5 Drawing Sheets

(56) References Cited

U.S. PATENT DOCUMENTS

| | | | |
|---|---|---|---|
| 2022/0279012 A1* | 9/2022 | Seetharamaiah | H04L 63/1425 |
| 2022/0329616 A1* | 10/2022 | O'Hearn | G06F 9/545 |
| 2023/0037616 A1* | 2/2023 | Karri | G06F 21/53 |
| 2023/0069334 A1 | 3/2023 | Reznik | |
| 2023/0168872 A1* | 6/2023 | Hang | G06F 9/44505 |
| | | | 715/762 |
| 2023/0171243 A1* | 6/2023 | Peddada | H04L 61/4505 |
| | | | 726/7 |
| 2023/0171244 A1* | 6/2023 | Peddada | G06F 16/2272 |
| | | | 726/7 |
| 2023/0275917 A1* | 8/2023 | Karmali | G06F 16/9537 |
| | | | 709/224 |
| 2024/0007492 A1* | 1/2024 | Shen | H04L 63/1425 |
| 2024/0036929 A1* | 2/2024 | Moyes | G06F 9/5072 |
| 2024/0193076 A1* | 6/2024 | Chen | G06F 11/3688 |
| 2024/0256497 A1* | 8/2024 | Sheen | G06F 11/3698 |
| 2024/0394113 A1* | 11/2024 | Wiegley | G06F 9/45558 |
| 2024/0411867 A1* | 12/2024 | Sakazi | G06F 21/577 |

OTHER PUBLICATIONS

Kor, et al., "Bridgecrewio/yor", Retrieved from: https://github.com/bridgecrewio/yor, Mar. 1, 2023, 6 Pages.

Smalling, Eric, "How and when to use Docker labels / OCI container annotations", Retrieved from: https://snyk.io/blog/how-and-when-to-use-docker-labels-oci-container-annotations/, Nov. 4, 2021, 6 Pages.

* cited by examiner

MAPPING PIPELINE RUN SOURCES AND TARGETS IN CLOUD INFRASTRUCTURES

BACKGROUND

Cloud service providers often offer a variety of computing resources and compute services, such as virtual machine instances. For instance, cloud computing providers typically offer networking services, database services, persistent data storage services, web application services, etc. Cloud computing providers frequently develop and implement a deployment process to manage how new services are launched and how existing services are updated. In some instances, the deployment process may include a pipeline that specifies various testing stages as well as workflows. Particularly, code of the pipeline may define orchestration of continuous integration (CI) and continuous delivery (CD) operations, may configure infrastructure-as-code (IaC) templates into resource provision plans, may install resources, may run scans for security and compliance, and may deploy artifacts built from code sources.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
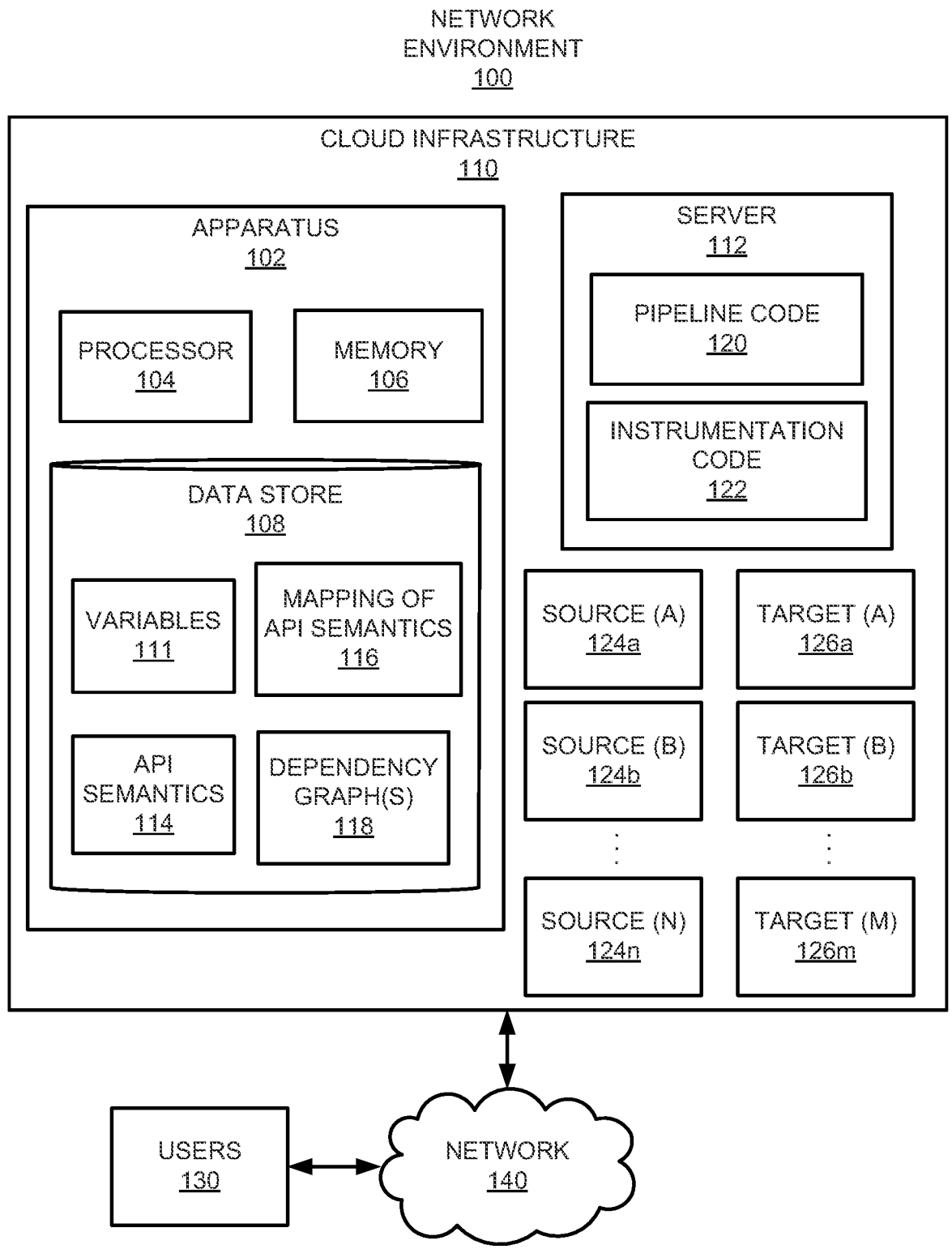
FIG. 1 shows a block diagram of a network environment, in which an apparatus of a cloud infrastructure is to build a dependency graph that maps pipeline run sources with pipeline run targets based on interactions between the pipeline run targets 126*a*-126*m* based on interactions between the pipeline run targets 126*a*-126*m* and the pipeline run sources 124*a*-124*n*, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. Pipeline-as-code is a trending technology for continuous integration (CI)/continuous delivery (CD) development operations (DevOps) pipeline providers. Pipeline-as-code is a practice of defining deployment pipelines through source code. The source code of the development pipelines may define orchestration of CI/CD operations, configure infrastructure-as-code (IaC) templates into resource provision plans, install resources, run scans for security and compliance, and deploy artifacts built from code-sources.

DevOps may be defined as a software development methodology in which software development and IT operations are integrated to improve and shorten the life cycle of systems development. A CI/CD pipeline is an automated set of processes utilized as part of or integrated into software DevOps. In some instances, the CI/CD pipeline is composed of several stages, which may include build, test, and deploy development, integration tests, etc. In addition, the CI/CD pipeline may be implemented on a cloud infrastructure, in which pipeline code of the CI/CD pipeline is executed on the cloud infrastructure. A cloud infrastructure may be defined as a collection of hardware and software components, such as computing power, networking, storage, and virtualization resources used to enable cloud computing. The CI/CD pipeline may be executed on the cloud infrastructure to install and/or update applications provided, for instance, by virtual machines in the cloud infrastructure. In some instances, during some or all of the stages of a CI/CD pipeline run, a number of pipeline actions may occur between sources and targets in the cloud infrastructure. The sources and targets may include sources and targets that are both internal and external to the cloud infrastructure.

In many instances, security personnel in cloud environments are concerned about hardening the cloud environments. In other words, the security personnel may seek to take some action to reduce or eliminate vulnerabilities, such as security vulnerabilities, misconfigurations, weaknesses, etc., in the cloud environments. In order to do so, the security personnel may seek to detect the root-causes of the vulnerabilities. However, it may often be relatively difficult to detect the root-causes of the vulnerabilities due to, for instance, the nature of agile development and the use of CI/CD pipelines. Particularly, the detection of the vulnerability root-causes may be difficult because various DevOps teams may make changes to the pipeline code that propagate though the pipeline into the run time environments and cause the vulnerabilities. Additionally, the number of pipelines and code repositories may often be very large and the pipelines may often include various stages, pipeline architectures, and tools. It may thus be relatively difficult to trace back the source code that caused a vulnerability and oftentimes, security personnel do not attempt to harden some vulnerabilities and instead, take the risk of reduced security. A technical issue with known manners of hardening vulnerabilities in pipeline code may thus be that it may be relatively difficult to map the source code to the vulnerabilities, e.g., mapping source code to run time resources, which may result in some vulnerabilities being available to be exploited.

In addition, during execution of some CI/CD pipeline runs in a cloud infrastructure, relatively large numbers of actions may occur between sources and targets, e.g., sources and targets of application programing interfaces (APIs). It may thus be difficult to identify the actions between the sources and targets and to determine relationships between the sources and targets. As a result, it may be technically difficult to determine relationships between source code and runtime resources. In other words, another technical issue associated with the analysis of existing CI/CD pipeline runs in cloud infrastructures may be that it may be technically difficult to detect potentially malicious activity (such as when vulnerabilities have been exploited) from interactions between sources and targets.

Disclosed herein are apparatuses, methods, and computer-readable media in which sources in a pipeline may be mapped to targets in the pipeline, in which the pipeline may be run in cloud infrastructure resources. The cloud infrastructure resources may include the sources and targets that take some action or upon which some action is taken during pipeline runs. For instance, dependencies of sources to the cloud infrastructure resources may be identified and mapped in a dependency graph. By way of example, in a map repository checkout API call, a repository uniform resource locator (URL), which may be construed as a source, may be mapped to a target directory of the checkout as a target of the repository checkout API call. As another example, in a map deployment API call, a deployment artifact path may be identified as a source of the deployment and the deployment target may be used as the target of the map deployment API call. Additional examples of sources and targets are provided herein below.

As also disclosed herein, a processor may parse the pipeline code used for a pipeline run in a cloud infrastructure and may replace the variables in the parsed pipeline code with values to which the variables respectively represent, in which the values correspond to pipeline run sources and pipeline run targets. In addition, the processor may identify how the pipeline run targets interact with the pipeline run sources. The processor may also build a dependency graph that map the pipeline run sources with the pipeline run targets based on interactions between the pipeline run targets and the pipeline run sources.

Through implementation of various features of the present disclosure, dependencies between runtime resources (e.g., pipeline run targets) in the cloud infrastructure and source code (e.g., pipeline run sources) may be determined and mapped to each other in the dependency graph. In some examples, the dependency graph may be analyzed to gain visibility into actions carried out in a pipeline run. The mapping in the dependency graph may allow the creation of code-to-cloud contextual cloud security posture management (CSPM), the creation of pipeline recommendations, the mapping of the tools used in a pipeline, the mapping of code sources used in a pipeline, the discovery of applications deployed in a pipeline, and/or the detection of changes made to the pipeline.

In addition, when a potential or real vulnerability is identified in a pipeline, the dependency graph may be used to map back or trace back to the root-cause of the vulnerability. The root-cause of the vulnerability may be, for instance, a certain source code, a certain repository on which a certain source code is stored, etc. By identifying the root-causes of vulnerabilities in a pipeline, the vulnerabilities may more readily be addressed, such as by removing the vulnerabilities, patching source code, increasing security on certain repositories, etc. According to examples, the dependency graph may also be used in the opposite direction, e.g., to identify vulnerabilities resulting from a source code or other source in the pipeline.

A technical improvement afforded through implementation of the features of the present disclosure may thus include the determination of root-causes of vulnerabilities in source code and/or runtime resources, such that the vulnerabilities may be hardened. The hardening of the vulnerabilities may result in increased security of the pipeline runs.

In some examples, the processor identifies whether there are one or more vulnerabilities in a pipeline run based on a comparison of the information shown in the dependency graph with information shown in a previously built dependency graph. That is, the processor may cause multiple pipeline runs to be executed using the same pipeline code and may build separate dependency graphs for each of the pipeline runs. The processor may determine whether there are changes between the dependency graphs and, if so, may determine that there have been some changes to the pipeline code. In some instances, the processor may determine that there are one or more vulnerabilities in the pipeline code when the changes exceed a predefined change level. The predefined change level may be defined based on historical data, testing, modeling, machine-learning, etc. as discussed in greater detail herein.

In any of these examples, based on a determination that one or more vulnerabilities have been identified, the processor at least one of outputs an alert or performs a remedial action. The processor may output an alert to an IT personnel, to an artificial intelligence application, or the like, such that the vulnerability may be hardened, e.g., the vulnerability may be patched, etc. In addition, or in other examples, the processor may perform a remedial action based on a determination that the vulnerability has been identified. In these examples, the processor may stop execution of the pipeline run, may block access to certain targets, may cause another security check to be executed, etc.

Figure 2A:
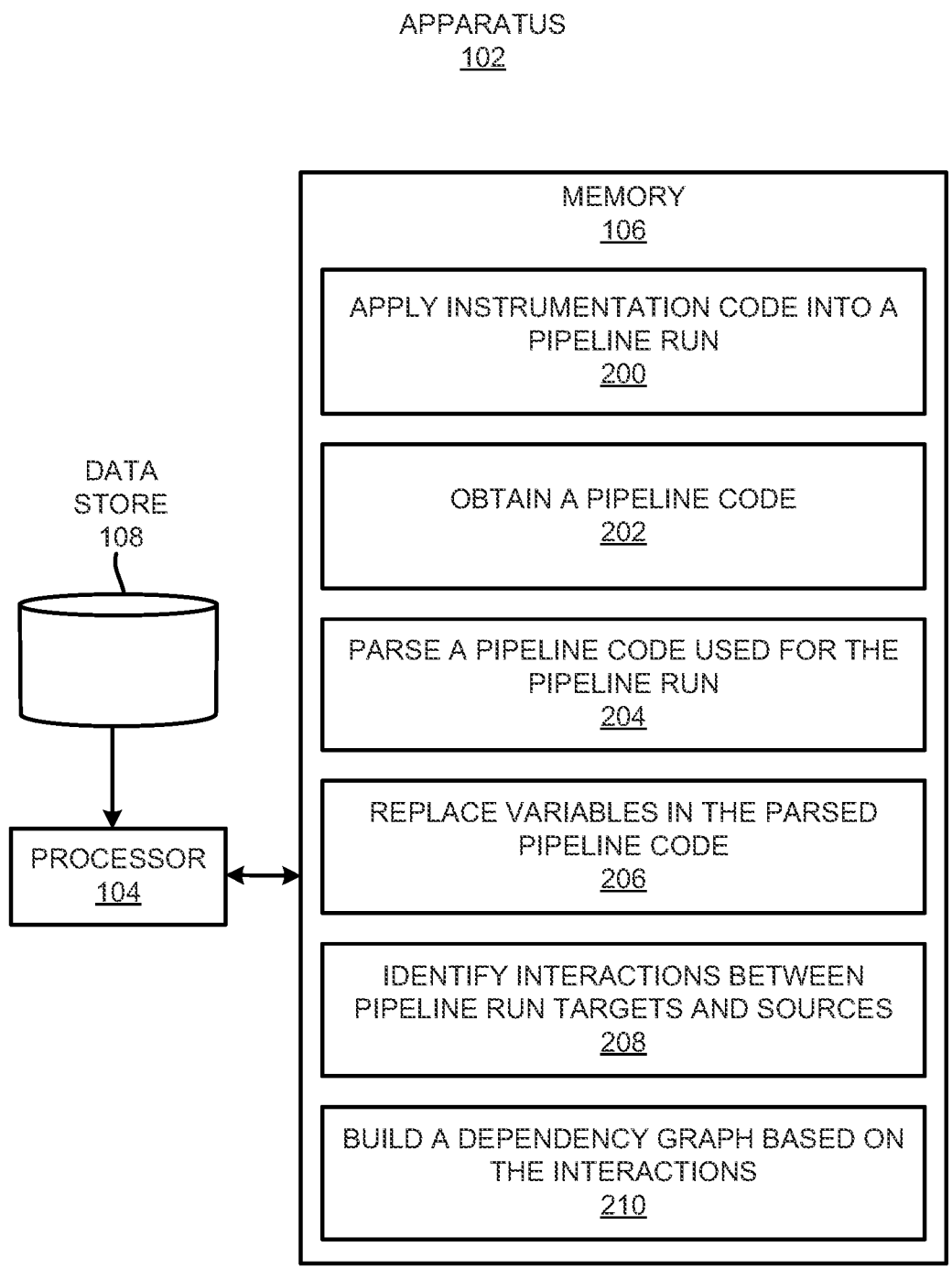
FIG. 2A depicts a block diagram of the apparatus depicted in FIG. 1, in accordance with an embodiment of the present disclosure.

Reference is first made to FIGS. 1 and 2A. FIG. 1 shows a block diagram of a network environment 100, in which an apparatus 102 of a cloud infrastructure 110 is to build a dependency graph that maps pipeline run sources 124a-124n with pipeline run targets 126a-126m based on interactions between the pipeline run targets 126a-126m and the pipeline run sources 124a-124n, in accordance with an embodiment of the present disclosure. FIG. 2A depicts a block diagram of the apparatus 102 depicted in FIG. 1, in accordance with an embodiment of the present disclosure. It should be understood that the network environment 100 and the apparatus 102 may include additional elements and that some of the elements described herein may be removed and/or modified without departing from the scopes of the network environment 100 and/or the apparatus 102.

In some examples, the cloud infrastructure 110 includes a collection of hardware and software components, such as computing power, networking, storage, and virtualization resources used to enable cloud computing. A cloud service provider may operate the cloud infrastructure 110, in which the cloud infrastructure 110 may be a platform on which applications, data storage services, servers, virtual machines, and/or the like may be provided to users 130 over a network 140, which may be the Internet. In other words, the cloud infrastructure 110 provides a cloud-based platform and/or cloud-based services to users 130, such as individual users, companies, institutions, and/or the like.

The cloud infrastructure 110 includes a server 112 (or a plurality of servers 112) that provides the cloud-based platform, etc., to the users 130. In some examples, the server 112 may execute a pipeline code 120 to cause a pipeline run to occur in the cloud infrastructure 110. The server 112 may execute the pipeline code 120 to cause the pipeline to run on the cloud infrastructure 110 to test a new application installation, to install an application, and/or to update an application in the cloud infrastructure 110. The pipeline code 120 may define operations that are to occur during the pipeline run. For instance, the pipeline code 120 may define orchestration of CI/CD operations, may configure infrastructure-as-code (IaC) templates into resource provision plans, may install resources, may run scans for security and compliance, and may deploy artifacts built from code-sources. Although particular reference is made herein to the server 112 executing the pipeline code 120, it should be understood that a plurality of servers 112 and/or one or more virtual machines may execute the pipeline code 120 without departing from a scope of the present disclosure.

During execution of the pipeline code 120, which may equivalently be termed the pipeline run, a plurality of actions between pipeline run sources 124a-124n (or simply sources 124a-124n) and pipeline run targets 126a-126m (or simply targets 126a-126m) may occur. The variables "n" and "m" may each represent a variable that is greater than one. The sources 124a-124n may be sources of API calls and the targets 126a-126m may be targets of the API calls during the pipeline runs. Thus, for instance, a source 124a may be a source of an API call to one or more targets 126a-126m of the API calls during a pipeline run. API's may be defined as ways for one program to interact with another program and API calls may include the mediums by which the API's interact. For instance, an API call may be a message that asks the server 112 for an API to provide a service or information. By way of particular example, the pipeline code 120 may pick up source code from a certain repository (source 124a), build the source code, and may deploy the source code on a virtual machine (target 126a). Additional examples of sources 124a-124n and targets 126a-126m are provided below.

According to examples, for some or all of the API calls in the pipeline run, the sources 124a-124n may be mapped to the targets 126a-126m of the API calls. In other words, the targets 126a-126m may be mapped to the sources 124a-124n based on which of the targets 126a-126m interacted with which of the sources 124a-124n. The functionalities and scopes of the API calls may also be mapped to the sources 124a-124n and the targets 126a-126m. Although the sources 124a-124n and the targets 126a-126m are depicted in FIG. 1 as being internal to the cloud infrastructure 110, it should be understood that some or all of the sources 124a-124n and the targets 126a-126m may be external to the cloud infrastructure 110 without departing from a scope of the present disclosure. In addition, it should be understood that the target 126a of one API call may be the source 124a of another API call and vice versa.

In some instances, vulnerabilities may exist in the cloud infrastructure 110, the sources 124a-124n, the targets 126a-126m, runtime resources utilized during pipeline runs, etc. The vulnerabilities may be, for instance, weaknesses in the security employed by the sources 124a-124n and/or targets 126a-126m, oversights that may be exploited, gaps through which unauthorized accessed may be gained to the sources 124a-124n and/or targets 126a-126m, security system misconfigurations, human error, etc. According to examples and as discussed herein, the apparatus 102 may build dependency graphs that map the sources 124a-124n and the targets 126a-126m. As also discussed herein, the dependency graphs may be used to identify root causes of the vulnerabilities, such that the vulnerabilities may be addressed.

The apparatus 102 is a type of computing device such as a server, a laptop computer, a desktop computer, a tablet computer, and/or the like. In some examples, the apparatus 102 is a server in the cloud infrastructure 110, a virtual machine in the cloud infrastructure 110, a computing device of an Internet technology (IT) professional of the cloud infrastructure 110, a computing device of an IT professional contracted by the service provider of the cloud infrastructure 110, etc. In addition or in other examples, the functionalities of and/or operations that the apparatus 102 performs are distributed across multiple servers, multiple virtual machines, and/or the like, on the cloud. In yet other examples, the apparatus 102 is external to the cloud infrastructure 110.

Although not shown in FIG. 1, in some examples, the cloud infrastructure 110 includes additional components to enable communication of data through the network 140. For instance, a plurality of servers 112 are housed in one or more data centers, which include network equipment to enable the communication of the data through the network 140. The network equipment includes gateways, firewalls, switches, and/or the like. In some examples, the servers 112 are in separate locations and data is communicated between the servers 112 through the network 140.

As shown in FIGS. 1 and 2, the apparatus 102 includes a processor 104 that controls operations of the apparatus 102. The apparatus 102 also includes a memory 106 on which instructions that the processor 104 accesses and/or executes are stored. In addition, the processor 104 includes a data store 108 on which the processor 104 stores various information. The processor 104 is a semiconductor-based microprocessor, a central processing unit (CPU), an application specific integrated circuit (ASIC), a field-programmable gate array (FPGA), and/or other hardware device. The memory 106, which may also be termed a computer readable medium, is, for example, a Random Access memory (RAM), an Electrically Erasable Programmable Read-Only Memory (EEPROM), a storage device, or the like. In some examples, the memory 106 is a non-transitory computer readable storage medium, where the term "non-transitory" does not encompass transitory propagating signals. In any regard, the memory 106 has stored thereon machine-readable instructions that the processor 104 executes. The data store 108 may also be a Random Access memory (RAM), an Electrically Erasable Programmable Read-Only Memory (EEPROM), a storage device, or the like.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and/or multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 are distributed across multiple apparatuses 102 and/or multiple processors 104.

With particular reference to FIGS. 1 and 2, the memory 106 has stored thereon machine-readable instructions 200-210 that the processor 104 is to execute. Although the instructions 200-210 are described herein as being stored on the memory 106 and thus include a set of machine-readable instructions, the apparatus 102 may include hardware logic blocks that may perform functions similar to the instructions 200-210. For instance, the processor 104 may include hardware components that may execute the instructions 200-210.

In other examples, the apparatus 102 may include a combination of instructions and hardware logic blocks to implement or execute functions corresponding to the instructions 200-210. In any of these examples, the processor 104 may implement the hardware logic blocks and/or execute the instructions 200-210. As discussed herein, the apparatus 102 may also include additional instructions and/or hardware logic blocks such that the processor 104 may execute operations in addition to or in place of those discussed above with respect to FIG. 2A.

The processor 104 is to execute the instructions 200 to apply, inject, or insert instrumentation code 122 into the pipeline run. The processor 104 may apply the instrumentation code 122 into the pipeline run to cause the instrumentation code 122 to be executed during the execution of the pipeline code 120. The instrumentation code 122 is to collect values of environment variables (e.g., sources 124a-124n and targets 126a-126m) used in the pipeline run and to analyze the pipeline code 120 given the collected values. The variables, which may also be termed runtime variables, may be assigned values during the pipeline run and may be used in various manners. For instance, a shell command, such as "env" may be executed, which may expose all of the values of the environment values from a pipeline task. Once the values are collected, the values may be assigned in other code-lines that consume these values. In this regard, the instrumentation code 122 may collect values of the variables 111 (e.g., sources 124a-124n and the targets 126a-126m of the API calls made during the pipeline run). In addition, the instrumentation code 122 may store the variables 111 in the data store 108.

The processor 104 is to execute the instructions 202 to obtain a pipeline code 120 used for a pipeline run in the cloud infrastructure 110. The processor 104 may obtain the pipeline code 120 from a log that may track elements associated with the execution of pipeline runs in the cloud infrastructure 110.

The processor 104 is to execute the instructions 204 to parse the pipeline code 120 to analyze a structure and a syntax of the pipeline code 120 and determine how variables 111 of the pipeline code 120 relate to each other. The processor 104 may parse the pipeline code 120 used for the pipeline run after the pipeline run has been completed. The processor 104 may parse the pipeline code 120 by analyzing the structure and syntax of the pipeline code 120 according to the rules of a particular programming language. Parsing the pipeline code 120 involves breaking down the pipeline code 120 into its individual components, such as keywords, variables, functions, and operators, and determining how the individual components relate to each other. The processor 104 may parse the pipeline code 120 to allow the processor to understand the pipeline code's 120 structure and semantics. In other words, the pipeline code 120 may be in a certain format that has a well-defined syntax that describes each action that the pipeline will execute. The processor 104 may parse the pipeline code 120 to determine the syntax of each of the actions.

The processor 104 is to execute the instructions 206 to replace the variables 111 in the parsed pipeline code with values to which the variables respectively represent, in which the values correspond to pipeline run sources 124a-124n and pipeline run targets 126a-126m. The processor 104 may replace the variables 111 based on the collected variables 111, pipeline configurations (e.g., pointers to repositories used in the pipeline) and statically defined variables. The processor 104 may replace the variables 111 by determining the specific values or references associated with those variables 111 in a programming or mathematical context. The variables 111 may represent unknown values or placeholders that need to be determined before the pipeline code 120 may be executed or evaluated. In addition, the processor 104 may replace the variables 111 during runtime of the pipeline code 120. The values of the variables 111 may be assigned either explicitly by a programmer or through calculations and operations within the pipeline code 120. Moreover, the processor 104 may replace the variables 111 by substituting the actual values or references into the pipeline code 120 where the variables 111 are used. For instance, the processor 104 may replace the variables 111 with the names of the sources 124a-124n and the targets 126a-126m of the API calls made in the pipeline run.

The processor 104 is to execute the instructions 208 to identify how the pipeline run targets 126a-126m interact with the pipeline run sources 124a-124n. For instance, the processor 104 may map API semantics 114 of the parsed pipeline code 120 using the variables 111 in the parsed pipeline code 120. The processor 104 may map the API semantics 114, e.g., the sources 124a-124n and the targets 126a-126m of the API calls, using the variables in the parsed pipeline code 120. For instance, the processor 104 may, for each of the API calls in the parsed pipeline code 120, map the functionality, the source 124a, the target 126a, and scope of the API call. Examples of mappings 116 of a number of API semantics 114 are provided below.

For a mapping of repository checkout API calls, the processor 104 may map the repository URL as a source 124a and the target directory of the checkout as a target 126a of the API call.

For a mapping of deployment API calls, the processor 104 may use a deployment artifact path as a source 124a of the deployment and a deployment target as a target-resource 126a. By way of example, the processor 104 may, for an ADO Kubernetes@1 task, use task inputs to identify the target K8S cluster as a target resource 126a and the source file 124a of the task as a source artifact.

The processor 104 may map file movement API calls (internal and external to the pipeline context), e.g., from sources 124a-124n to targets 126a-126m. The processor 104 may map API calls that run a security check, API calls that install software packages, etc.

For a mapping of infrastructure-as-code (IaC) deployment API calls, the processor 104 may calculate the target 126a of the deployment by fetching an IaC template from a source repository 124a and assigning relevant parameters to the IaC template.

The processor 104 may analyze API calls in embedded scripts. For instance, the processor 104 may analyze powershell/cli commands by mapping their API functionality. By way of particular example, if the functionality is one of the functionalities listed above, the processor 104 may reuse the same technique (e.g., if powershell includes an "New-AzDeployment-TemplateFile ARM.json", then reuse the IaC template mapping).

The processor 104 may map the pipeline code 120 itself as a source of all pipeline actions.

The processor 104 is to execute the instructions 210 to build a dependency graph 118 that maps the pipeline run sources 124a-124n with the pipeline run targets 126a-126m based on interactions between the pipeline run targets 126a-126m and the pipeline run sources 124a-124n. In other words, the processor 104 may build the dependency graph 118 based on the mapped API semantics, e.g., the mapped sources 124a-124n and targets 126a-126m. The dependency graph 118 may represent dependencies of some or all of the sources 124a-124n and the targets 126a-126m of the API calls made during the pipeline run. For instance, the dependency graph 118 may identify which targets 126a-126m are the targets of which of the sources 124a-124n during the pipeline run. In some examples, the processor 104 may, for each of at least some of the API calls in the parsed pipeline code 120, map a functionality, a source, a target, and a scope of the API call. In addition, the processor 104 may build the dependency graph 118 based on the mapped functionalities, sources, targets, and scopes of the at least some API calls.

Figure 2B:
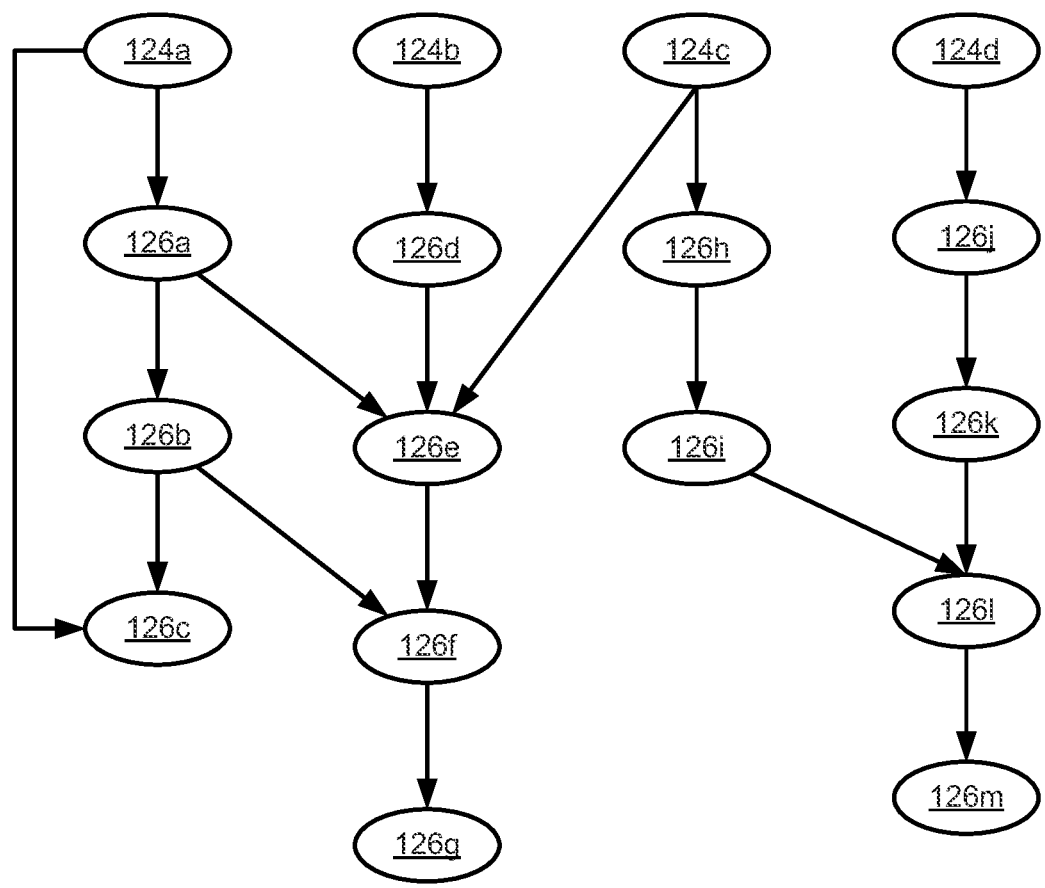
FIG. 2B depicts an example of a dependency graph, in accordance with an example of the present disclosure.

An example of a dependency graph 118 is depicted in FIG. 2B, in according with an example of the present disclosure. It should clearly be understood that the dependency graph 118 depicted in FIG. 2B is provided for illustrative purposes and that the features shown there should not be construed as limiting the present disclosure to what is shown in that figure. As shown in FIG. 2B, a plurality of targets 126a-126m may have dependencies upon or to a plurality of sources 124a-124d. In addition, some of the targets 126a-126m may have dependencies upon or to other targets 126a-126m, and in some instances, to multiple ones of the targets 126a-126m.

According to examples, when a vulnerability is detected in the pipeline, the dependency graph 118 may be employed to identify a root cause of the vulnerability. As discussed herein, the vulnerability may be a weakness in the pipeline, such as a configuration of pipeline scans, pipeline secrets, tools used in the pipeline, source code used in the pipelines, sources of artifacts, security measures of the artifacts, pipeline misconfigurations, etc. Thus, for instance, if a vulnerability is detected in a target 126g in the pipeline, for instance, by a security personnel, a security application, the processor 104, or the like, the dependency graph 118 may be employed to map the target 126g with the vulnerability back to a source 124a from which the target 126a depends. By identifying the source 124a, the root cause the vulnerability may be identified and the vulnerability may be addressed. For instance, the root cause of the vulnerability may be an improper or inaccurate security scan of a source code and the vulnerability may be addressed by applying an updated patch to the source code, by adding a proper security scan on the source code, etc. As another example in which the root cause of the vulnerability is in a repository on which the source code is stored, the vulnerability may be addressed by ensuring that certain security checks are implemented on the repository.

According to examples, source code to target runtime resources may be mapped using graph traversal techniques on the dependency graph 118. In addition, software packages used in the pipeline may be provided by detecting all of the sources in the dependency graph 118. Moreover, pipeline misconfigurations may be detected by running rules that inspect the functionality and dependency of sources and 124a-124n and targets 126a-126m in the dependency graph 118. Still further, malicious activity may be detected by detecting suspicious changes to dependency graphs 118 built over time.

A pipeline run misconfiguration may originate from the pipeline code 120 and may be translated into a pipeline-run misconfiguration. An example of a pipeline run misconfiguration is a lack of a security scan of a "to be deployed" code (e.g., the pipeline has a task that deploys an ARM template, but does not scan the ARM template for security issues before deployment). The processor 104 may determine that the pipeline (or pipeline run) includes a vulnerability based on a determination that a pipeline run misconfiguration has occurred. As a yet further example, the processor 104 may identify potential attack paths into the pipeline from the dependency graph 118.

In some examples, the processor 104 may determine that there may be vulnerabilities in the pipeline in instances in which there are one or more anomalous changes to the dependency graph 118. In these examples, one or more additional pipeline runs may be performed in the cloud infrastructure 110 and the processor 104 may build dependency graphs 118 for the additional pipeline runs. By way of example, the processor 104 may parse a second pipeline code used for a second pipeline run in the cloud infrastructure 110, may resolve variables in the second parsed pipeline code, may map API semantics of the second parsed pipeline code using the variables in the second parsed pipeline code and may build a second dependency graph based on the mapped API semantics of the second parsed pipeline code. The processor 104 may also determine that there is a change between the second dependency graph and the dependency graph 118 and may determine that there may be a vulnerability in the pipeline code 120 based on a determination that there is a change between the second dependency graph and the dependency graph 118.

For instance, the processor 104 may determine that a vulnerability may have been introduced into the pipeline based on a determination that the change in the pipeline is anomalous. By way of particular example, the processor 104 may determine whether the change exceeds a predefined level of change and if so, the processor 104 may determine that a vulnerability has been introduced into the pipeline. The predefined level of change may be determined through testing, historical data, machine-learning using historical data, etc.

For instance, the processor 104 may apply a machine learning operation on mappings between the sources 124a-124n and the targets 126a-126m from prior pipeline runs. The processor 104 may apply a suitable machine learning operation on the prior mappings. In some examples, the processor 104 provides feature vectors of the prior mappings into the machine learning operation and the machine learning operation determines learned behavior from the feature vectors. The machine learning operation includes, for instance, linear regression, Naive Bayes, K-means, random forest, and logistic regression.

In some examples, the processor 104 compares feature vector(s) of the mappings with feature vector(s) of the learned behavior(s) to make this determination while in other examples, the processor 104 compares natural language versions of the mappings and the learned behavior(s). In some examples, the processor 104 determines that the second pipeline run may include vulnerabilities based on the identified mappings from the learned behavior by a margin that exceeds a predefined threshold. The predefined threshold may be user-defined or may be determined through application of a machine learning operation on past data. For instance, the machine learning operation may take as inputs feature vectors of the mappings, the learned behavior corresponding to the mappings, and data pertaining to instances in which various differences resulted in normal and anomalous pipeline runs. The output of the machine learning operation may be the threshold, e.g., the predefined threshold, at which the difference may be deemed to be vulnerable. The processor 104 may use any suitable machine learning operation such as, linear regression, Naive Bayes, K-means, random forest, or logistic regression to determine predefined threshold.

In some examples, the predefined threshold may be zero. In these examples, the processor 104 may determine that the pipeline includes vulnerabilities when the processor 104 determines that there is any difference between the second dependency graph and the dependency graph 118. In other examples, the predefined threshold may be some value greater than zero, in which case the processor 104 may determine that the pipeline includes vulnerabilities even though there is some level of change between the second dependency graph and the dependency graph 118.

According to examples, the processor 104 may, based on the pipeline being determined to include one or more vulnerabilities, at least one of output an alert or perform a remedial action. The processor 104 may output an alert to an IT personnel, to an artificial intelligence application, or the like, such that the one or more vulnerabilities may be hardened. The vulnerabilities may be hardened by, for instance, including additional security checks on the vulnerable sources/targets, applying patches to security applications, etc. The IT personnel may, for instance, use the alert to determine that a remedial action to harden the vulnerabilities may be prioritized over other tasks to patch a potential security vulnerability. In addition, or in other examples, the processor 104 may perform a remedial action based on a determination that the vulnerability has been identified. In these examples, the processor 104 may stop execution of the pipeline run, may block access to certain targets, may cause another security check to be executed, may prevent an application associated with the pipeline run from being added or updated, etc.

Figure 3:
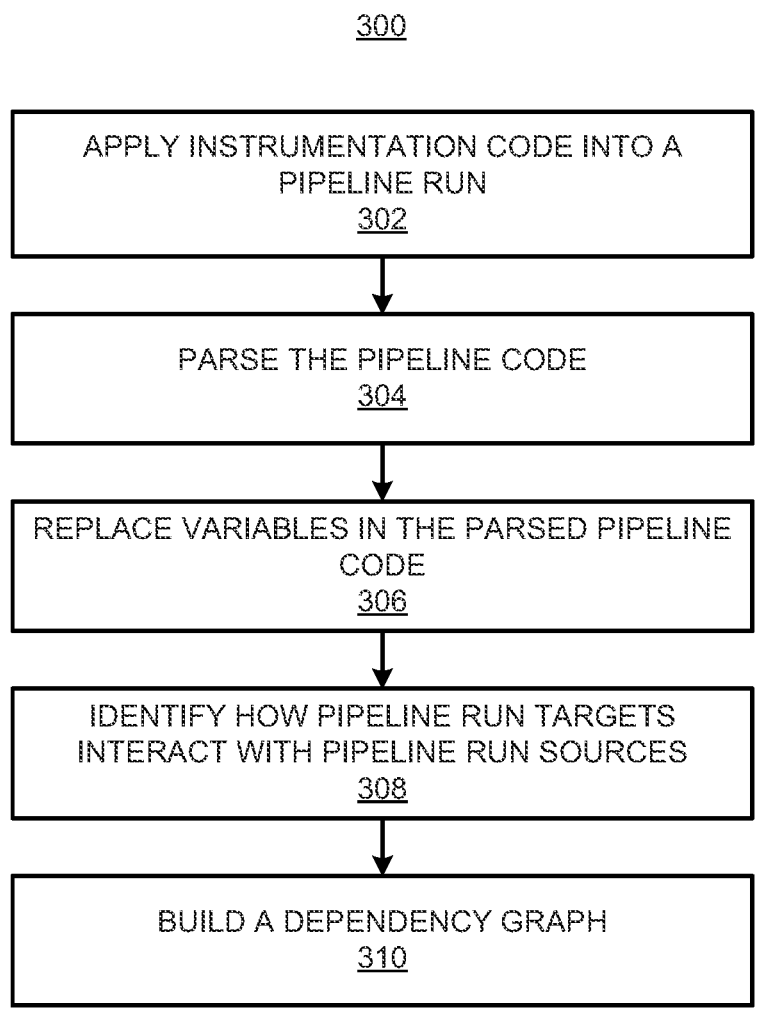
FIG. 3 depicts a flow diagram of a method for building a dependency graph that maps pipeline run sources with pipeline run targets, in accordance with an embodiment of the present disclosure.

Various manners in which the processor 104 of the apparatus 102 operates are discussed in greater detail with respect to the method 300 depicted in FIG. 3. Particularly, FIG. 3 depicts a flow diagram of a method 300 for building a dependency graph that maps pipeline run sources with pipeline run targets, in accordance with embodiments of the present disclosure. As discussed herein, a pipeline code 120 may be executed in a cloud infrastructure 110 to cause a pipeline run to be executed in the cloud infrastructure 110. It should be understood that the method 300 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 104 applies instrumentation code 122 into a pipeline run in the cloud infrastructure 110. As discussed herein, a pipeline code 120 is used for the pipeline run and the instrumentation code 122 is to collect values of environment variables 111 used in the pipeline run and analyze the pipeline code 120 given the collected values.

At block 304, the processor 104 parses the pipeline code 120 used for the pipeline run to determine how variables 111 of the pipeline code 120 relate to each other. The processor 104 may parse the pipeline code 120 after the pipeline run has been completed. At block 306, the processor 104 replaces the variables 111 in the parsed pipeline code with values to which the variables respectively represent, in which the values correspond to pipeline run sources 124a-124n and pipeline run targets 126a-126m. The processor 104 may replace the variables 111 in the parsed pipeline code 120 based on collected values of environment variables used in the pipeline run, pipeline configurations, and statically defined variables.

At block 308, the processor 104 identifies how the pipeline run targets 126a-126m interact with the pipeline run sources 124a-124n. For instance, the processor 104 maps API semantics 114 of the parsed pipeline code 120 using the variables 111 in the parsed pipeline code 120. At block 310, the processor 104 builds a dependency graph 118 that maps the pipeline run sources 124a-124n with the pipeline run targets 126a-126m based on interactions between the pipeline run targets 126a-126m and the pipeline run sources 124a-124n. In some examples, the processor 104, for each of at least some API calls in the parsed pipeline code, maps a functionality, a source, a target, and a scope of the API call and build the dependency graph 118 based on the mapped functionalities, sources, targets, and scopes of the at least some API calls.

In some examples, the processor 104 builds a second dependency graph for a second pipeline run in the cloud infrastructure 110. In addition, the processor 104 parses a second pipeline code used for the second pipeline run, replaces variables in the parsed second pipeline code, identifies how the pipeline run targets 126a-126m interact with the pipeline run sources 124a-124n, and builds the second dependency graph that maps the pipeline run sources 124a-124n with the pipeline run targets 126a-126m.

The processor 104 also determines that there is a change between the second dependency graph and the dependency graph 118 for the pipeline run. The processor 104 determines whether the change corresponds to a vulnerability associated with the second pipeline run. In addition, based on a determination that the change corresponds to a vulnerability, the processor 104 at least one of outputs an alert or performs a remedial action.

In some examples, some or all of the operations set forth in the method 300 are included as utilities, programs, or subprograms, in any desired computer accessible medium. In some examples, the method 300 is embodied by computer programs, which may exist in a variety of forms both active and inactive. For example, the computer programs exist as machine-readable instructions, including source code, object code, executable code or other formats. Any of the above, in some examples, are embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
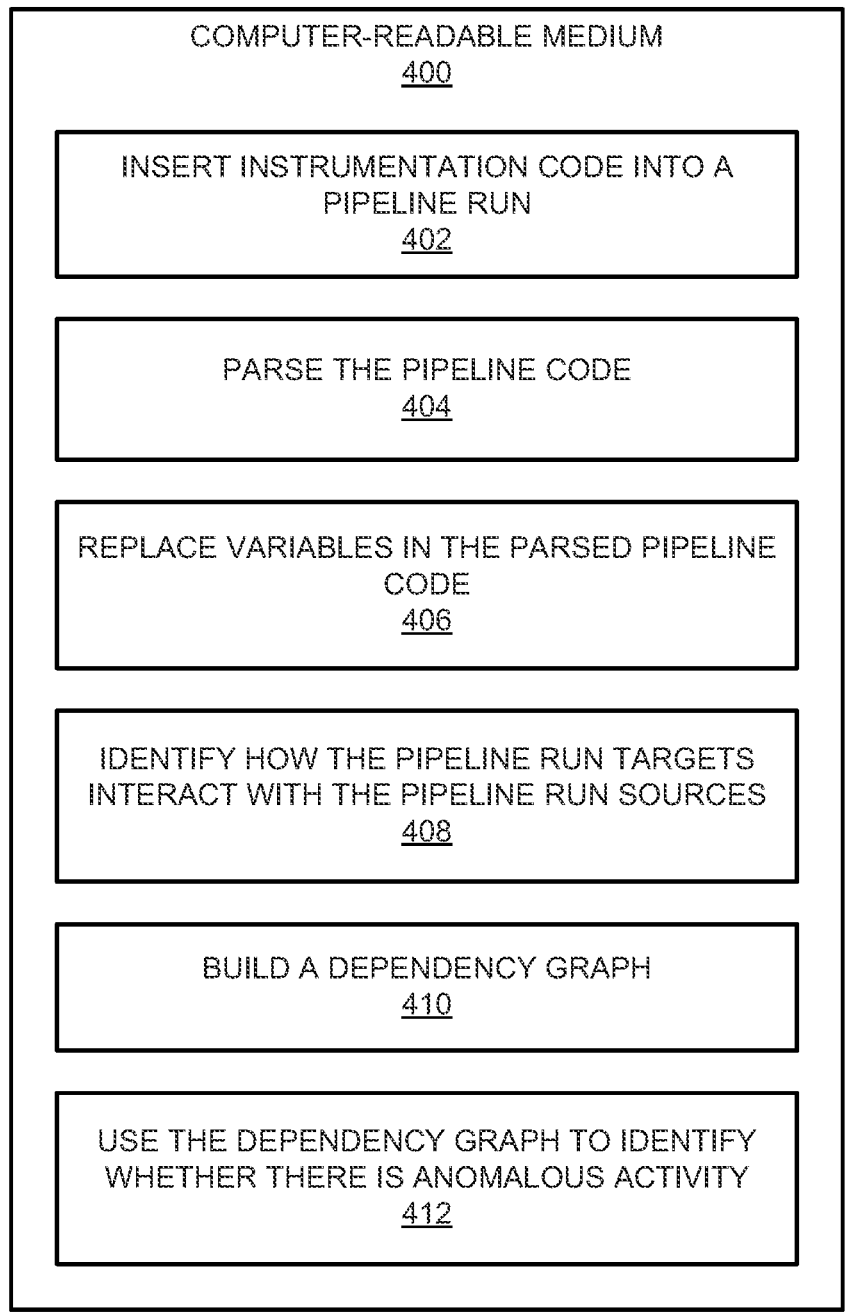
FIG. 4 depicts a block diagram of a computer-readable medium that has stored thereon computer-readable instructions for building a dependency graph that maps pipeline run sources with pipeline run targets based on interactions between the pipeline run targets and the pipeline run sources, in accordance with an embodiment of the present disclosure.

Turning now to FIG. 4, there is shown a block diagram of a computer-readable medium 400 that has stored thereon computer-readable instructions for building a dependency graph that maps pipeline run sources 124a-124n with pipeline run targets 126a-126m based on interactions between the pipeline run targets 126a-126m and the pipeline run sources 124a-124n, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. In some examples, the computer-readable medium 400 is a non-transitory computer-readable medium, in which the term "non-transitory" does not encompass transitory propagating signals.

As shown in FIG. 4, the computer-readable medium 400 has stored thereon computer-readable instructions 402-412 that a processor, such as a processor 104 of the apparatus 102 depicted in FIGS. 1 and 2, executes. The computer-readable medium 400 is an electronic, magnetic, optical, or other physical storage device that contains or stores executable instructions. The computer-readable medium 400 is, for example, Random Access memory (RAM), an Electrically Erasable Programmable Read-Only Memory (EEPROM), a storage device, an optical disc, and the like.

The processor executes the instructions 402 to insert instrumentation code 122 into a pipeline run in a cloud infrastructure 110, in which a pipeline code 120 is used for the pipeline run. The instrumentation code 122 is to collect values of environment variables used in the pipeline run and analyze the pipeline code 120 given the collected values.

The processor executes the instructions 404 to parse the pipeline code 120 used for the pipeline run to determine how variables of the pipeline code 120 relate to each other. The processor executes the instructions 406 to replace the variables 111 in the parsed pipeline code 120 with values to which the variables respectively represent, in which the values correspond to pipeline run sources 124a-124n and pipeline run targets 126a-126m. In some examples, the processor replaces the variables 111 in the parsed pipeline code 120 based on collected values of environment variables used in the pipeline run, pipeline configuration, and statically defined variables.

The processor executes the instructions 408 to identify how the pipeline run targets 126a-126m interact with the pipeline run sources 124a-124n. For instance, the processor may map API semantics 114 of the parsed pipeline code 120 using the variables 111 in the parsed pipeline code 120. The processor executes the instructions 410 to build a dependency graph 118 that maps the pipeline run sources 124a-124n with the pipeline run targets 126a-126m based on interactions between the pipeline run targets 126a-126m and the pipeline run sources 124a-124n. Additionally, the processor executes the instructions 412 to use the dependency graph to identify whether there is anomalous activity associated with the pipeline run.

In some examples, the processor executes instructions to build a second dependency graph for a second pipeline run in the cloud infrastructure 110. The processor also executes instructions to determine that there is a change between the second dependency graph and the dependency graph 118 for the pipeline run and to determine whether the change corresponds to a vulnerability associated with the pipeline.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that when executed by the processor, cause the processor to:
obtain a pipeline code used for a pipeline run in a cloud infrastructure;
parse the pipeline code to analyze a structure and a syntax of the pipeline code to determine how variables of the pipeline code relate to each other;
replace the variables in the parsed pipeline code with values to which the variables respectively represent, wherein the values correspond to pipeline run sources and pipeline run targets of application program interface (API) calls;
identify how the pipeline run targets interact with the pipeline run sources of the API calls; and
build a dependency graph that maps the pipeline run sources with the pipeline run targets based on interactions between the pipeline run targets and the pipeline run sources.

2. The apparatus of claim 1, wherein the instructions cause the processor to:
apply instrumentation code in the pipeline run, wherein the instrumentation code is to:
collect values of environment variables used in the pipeline run; and
analyze the pipeline code given the collected values.

3. The apparatus of claim 1, wherein the instructions to replace the variables in the parsed pipeline code with values to which the variables respectively represent further cause the processor to:
replace the variables in the parsed pipeline code based on:
collected values of environment variables used in the pipeline run;
pipeline configurations; and
statically defined variables.

4. The apparatus of claim 1, wherein the instructions cause the processor to:
for each of at least some API calls in the parsed pipeline code,
map a functionality, a pipeline run source, a pipeline run target, and a scope of the API call; and
build the dependency graph based on the mapped functionalities, pipeline run sources, pipeline run targets, and scopes of the at least some API calls.

5. The apparatus of claim 1, wherein the instructions cause the processor to:
at least one of:
identify mappings between pipeline run sources to pipeline run targets through use of a graph traversal technique on the dependency graph; or
identify software packages used in the pipeline run based on pipeline run sources included in the dependency graph.

6. The apparatus of claim 1, wherein the instructions cause the processor to:
use the dependency graph to identify whether there is anomalous activity associated with the pipeline run; and
based on an anomalous activity associated with the pipeline run being identified, at least one of:
output an alert; or
perform a remedial action.

7. The apparatus of claim 1, wherein the instructions cause the processor to:
run a rule that inspects a functionality and dependency of the pipeline run sources and pipeline run targets in the dependency graph to detect a pipeline run misconfiguration.

8. The apparatus of claim 1, wherein the instructions cause the processor to:
parse a second pipeline code used for a second pipeline run in the cloud infrastructure;

replace variables in the second parsed pipeline code with a second set of values to which the variables in the second parsed pipeline code respectively represent, wherein the second set of values correspond to pipeline run sources and pipeline run targets of API calls;

identify how the pipeline run targets interact with the pipeline run sources in the second pipeline run;

build a second dependency graph that includes a mapping between the pipeline run sources and the pipeline run targets based on interactions between the pipeline run sources and the pipeline run targets in the second pipeline run;

determine that there is a change between the second dependency graph and the dependency graph; and determine that there is a vulnerability in the second pipeline run based on a determination that there is a change between the second dependency graph and the dependency graph.

9. The apparatus of claim 8, wherein the instructions cause the processor to:
based on the vulnerability in the second pipeline code being determined, at least one of:
output an alert; or
perform a remedial action.

10. A method comprising:
applying, by a processor, instrumentation code into a pipeline run in a cloud infrastructure, wherein a pipeline code is used for the pipeline run and wherein the instrumentation code is to:
collect values of environment variables used in the pipeline run; and
analyze the pipeline code given the collected values;
parsing, by the processor, the pipeline code to determine how variables of the pipeline code relate to each other;
replacing, by the processor, the variables in the parsed pipeline code with values to which the variables respectively represent, wherein the values correspond to pipeline run sources and pipeline run targets;
identifying, by the processor, how the pipeline run targets interact with the pipeline run sources; and
building, by the processor, a dependency graph that maps the pipeline run sources with the pipeline run targets based on interactions between the pipeline run targets and the pipeline run sources.

11. The method of claim 10, where replacing, by the processor, the variables in the parsed pipeline code with values to which the variables respectively represent further comprises:
replacing the variables in the parsed pipeline code based on:
collected values of environment variables used in the pipeline run;
pipeline configurations; and
statically defined variables.

12. The method of claim 10, further comprising:
for each of at least some application program interface (API) calls in the parsed pipeline code,
mapping a functionality, a pipeline run source, a pipeline run target, and a scope of the API call; and
building the dependency graph based on the mapped functionalities, pipeline run sources, pipeline run targets, and scopes of the at least some API calls.

13. The method of claim 10, wherein analyzing the dependency graph further comprises:
at least one of:
identifying mappings between pipeline run sources to pipeline run targets from the dependency graph;
identifying software packages used in the pipeline run based on pipeline run sources included in the dependency graph; or
detecting a pipeline run misconfiguration from the dependency graph.

14. The method of claim 10, further comprising:
building a second dependency graph for a second pipeline run in the cloud infrastructure;
determining that there is a change between the second dependency graph and the dependency graph for the pipeline run;
determining whether the change corresponds to a vulnerability associated with the second pipeline run; and
based on a determination that the change corresponds to a vulnerability associated with the second pipeline run, at least one of:
outputting an alert; or
performing a remedial action.

15. The method of claim 14, further comprising:
parsing a second pipeline code used for the second pipeline run;
replacing variables in the parsed second pipeline code with a second set of values to which the variables in the second parsed pipeline code respectively represent, wherein the second set of values correspond to pipeline run sources and pipeline run targets of API calls;
identifying how the pipeline run targets interact with the pipeline run sources in the second pipeline run; and
building the second dependency graph to include a mapping between the pipeline run sources and the pipeline run targets based on interactions between the pipeline run sources and the pipeline run targets in the second pipeline run.

16. The method of claim 10, further comprising:
using the dependency graph to identify whether there is anomalous activity associated with the pipeline run; and
based on an anomalous activity associated with the pipeline run being identified, at least one of:
outputting an alert; or
performing a remedial action.

17. A non-transitory computer-readable medium on which is stored a plurality of instructions that when executed by a processor, cause the processor to:
insert instrumentation code into a pipeline run in a cloud infrastructure, wherein a pipeline code is used for the pipeline run and wherein the instrumentation code is to:
collect values of environment variables used in the pipeline run; and
analyze the pipeline code given the collected values;
parse the pipeline code used for the pipeline run to determine how variables of the pipeline code relate to each other;
replace the variables in the parsed pipeline code with values to which the variables respectively represent, wherein the values correspond to pipeline run sources and pipeline run targets;
identify how the pipeline run targets interact with the pipeline run sources;
build a dependency graph that maps the pipeline run sources with the pipeline run targets based on interactions between the pipeline run targets and the pipeline run sources; and
use the dependency graph to identify whether there is anomalous activity associated with the pipeline run.

18. The non-transitory computer-readable medium of claim 17, wherein the instructions to replace the variables in the parsed pipeline code with values to which the variables respectively represent further cause the processor to:
    replace the variables in the parsed pipeline code based on:
        collected values of environment variables used in the pipeline run;
        pipeline configurations; and
        statically defined variables.

19. The non-transitory computer-readable medium of claim 17, wherein to analyze the dependency graph, the instructions cause the processor to:
    at least one of:
        identify mappings between pipeline run sources to pipeline run targets from the dependency graph;
        identify software packages used in the pipeline run based on pipeline run sources included in the dependency graph; or
        detect a pipeline run misconfiguration from the dependency graph.

20. The non-transitory computer-readable medium of claim 17, wherein the instructions cause the processor to:
    build a second dependency graph for a second pipeline run in the cloud infrastructure;
    determine that there is a change between the second dependency graph and the dependency graph for the pipeline run; and
    determine whether the change corresponds to a vulnerability associated with the second pipeline run.

* * * * *